(No Model.)
A. L. KANE.
FEED BOX FOR HORSES.
No. 301,898. Patented July 15, 1884.
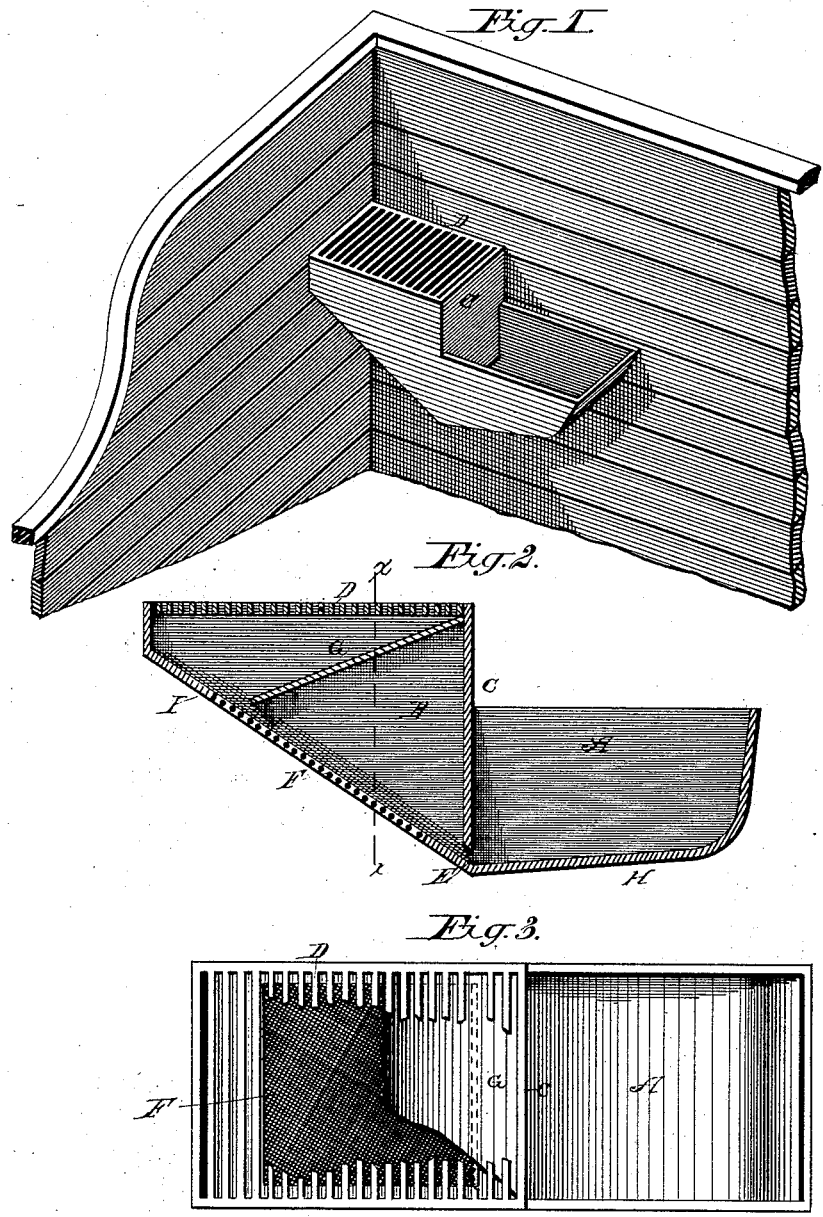
Witnesses:
C. B. Story
Wm. Sinnott
Inventor:
Alonzo L. Kane
By,
Erwin F. Benedict
Attorneys

United States Patent Office.

ALONZO L. KANE, OF MILWAUKEE, WISCONSIN.

FEED-BOX FOR HORSES.

SPECIFICATION forming part of Letters Patent No. 301,898, dated July 15, 1884.

Application filed December 26, 1883. (No model.)

*To all whom it may concern:*

Be it known that I, ALONZO L. KANE, a citizen of the United States, residing at Milwaukee, in the county of Milwaukee and State of Wisconsin, have invented certain new and useful Improvements in Feed-Boxes for Horses and other Animals; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in feed-boxes for horses and other animals. The objects of my improvements are, first, to prevent the animal when eating from wasting his grain or crowding it from the box; second, to control the admission of grain to the horse, whereby he has access to but a small quantity at a time, and is thereby prevented from eating too fast; third, to provide for the escape of hay, seed, and other foreign substances from the grain as it passes into the feed-trough.

My invention is further explained by reference to the accompanying drawings, in which—

Figure 1 represents a perspective view of the feed-box attached to a manger. Fig. 2 is a longitudinal vertical section. Fig. 3 is a top view, and Fig. 4 is a cross-section drawn on line *x x* of Fig. 2.

Like parts are represented by the same reference-letters throughout the several views.

The feed-box proper consists in a feed-trough, A, and a grain-receptacle, B, which parts may be made of wood separately, but are preferably made of iron cast in a single piece, and when thus constructed it is both strong and durable. C is a partition separating the feed-trough from the grain-receptacle. The receptacle B is provided with a cover, D, by which the horse is prevented from reaching the grain therein. The cover D is made open, as shown, so that I am enabled to pour the grain into the receptacle without removing such cover.

The upper surface of the bottom I is made concave in shape, as shown in Fig. 4, whereby the grain thereon flows to the center, and is thereby prevented from becoming clogged in the corners against the sides of the box. Said curved bottom is arranged at an acute angle to the partition C, toward which partition it inclines downward from the back of the box in such a manner as to cause the contents of the receptacle to flow forward of its own gravity into the feed-trough. The lower edge of the partition C terminates directly above the angle formed by the junction of the two bottoms I and H, and is provided with a small opening, E, through which the grain gradually escapes from the grain-receptacle into the feed-trough as fast only as it is eaten by the animal. The bottom H inclines slightly upward as it recedes from the partition C, whereby the grain as it enters said trough is prevented from spreading or flowing across such bottom, and is caused to close up the opening E, whereby but a small quantity of grain only is accessible to the animal at a time, and whereby it is impossible for him to eat his grain too fast or to crowd it from the box.

F is a screen formed in the inclined bottom I, over which the grain passes as it is poured into the receptacle B, and through which hay-seed, sand, and other foreign substances escape from the grain.

G is a grain-board, upon which the grain falls as it is thrown into the grain-receptacle, and by which it is carried of its own gravity to the rear end of the screen F, and is thereby caused to flow over the greater part of the surface of the screen in passing to the outlet-opening, whereby the foreign substances in the grain are more effectually separated therefrom.

I am aware of the form of feed-box shown in United States Patent No. 120,906, in which the bottom of the trough is made concave, and I make no claim to the form of construction therein shown.

Having thus described my invention, what I claim as new, and desire to secure by Letters Patent, is—

1. In a feed-box, the combination of the feed-trough A, grain-receptacle B, having downwardly-inclined bottom I, concave above the bottom of the feed-trough A, and partition C, provided with opening E, the concave surface of said bottom I being adapted to cause the grain to flow toward its center, whereby it is prevented from clogging against the sides of the receptacle in its course to the feed-trough, substantially as set forth.

2. In a feed-box, the combination of feed-trough A, partition C, having opening E, grain-receptacle B, having an inclined bottom, I, provided with screen F, and grain-board G, said board being adapted to conduct the grain to the upper part of said screen, whereby in passing to the feed-box sand and other foreign substances are separated therefrom, as set forth.

3. The combination, in a feed-box, of the feed-trough A, having an upwardly-inclined bottom, H, grain-receptacle B, having a downwardly-inclined bottom, I, provided with a screen, F, grain-board G, open cover D, and partition C, provided with opening or grain-passage E, all substantially as and for the purpose specified.

In testimony whereof I affix my signature in presence of two witnesses.

ALONZO L. KANE.

Witnesses:
JAS. B. ERWIN,
C. T. BENEDICT.